United States Patent Office 3,111,201
Patented Nov. 19, 1963

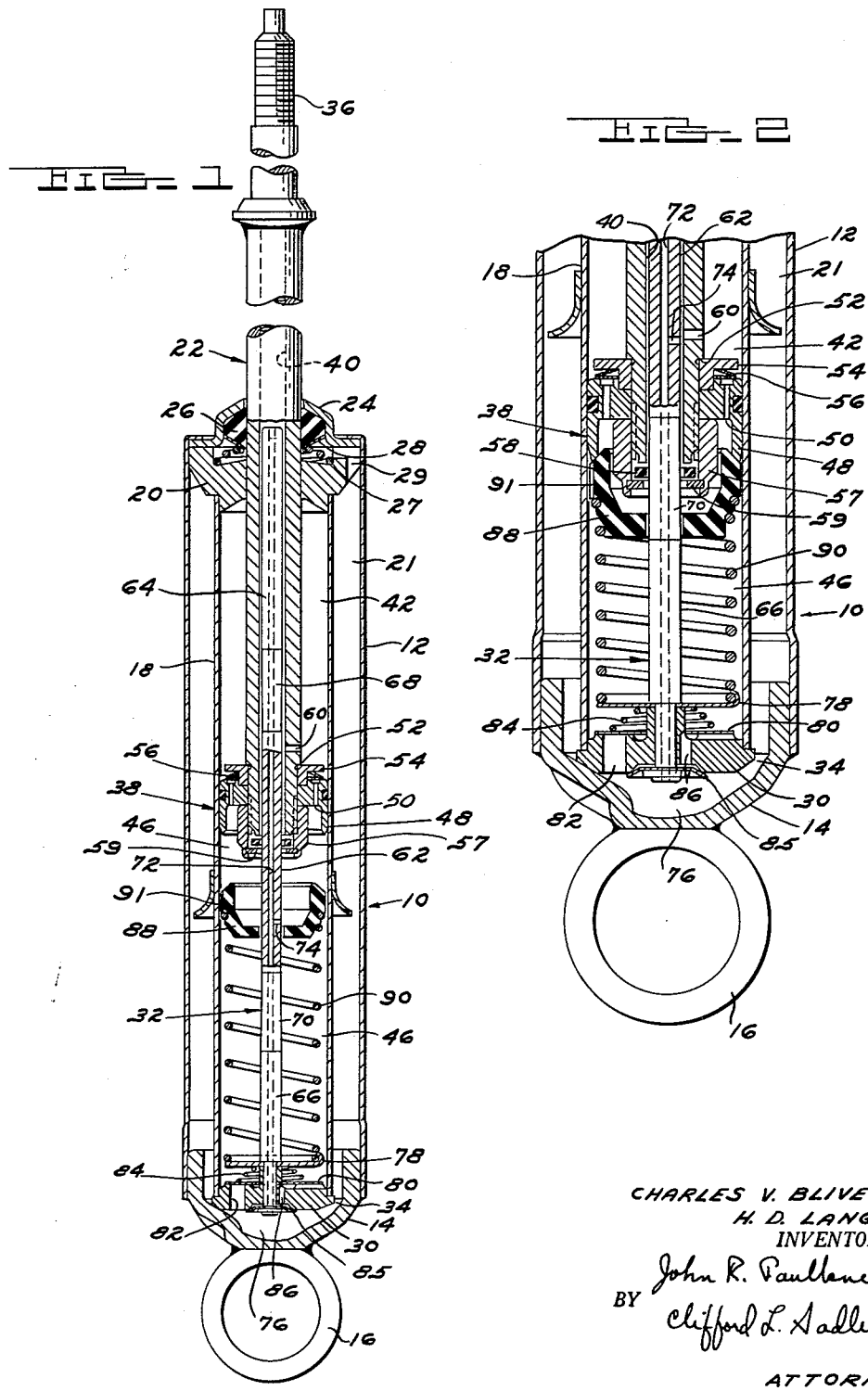

3,111,201
HYDRAULIC SHOCK ABSORBER
Charles V. Bliven, Belleville, and Hans D. Lange, Chelsea, Mich., assignors to Ford Motor Company, Dearborn, Mich., a corporation of Delaware
Filed Apr. 27, 1961, Ser. No. 105,946
6 Claims. (Cl. 188—88)

The present invention relates to hydraulic shock absorbers, and more particularly to shock absorbers of the direct acting telescopic type.

The placing of shock absorbers between sprung and unsprung components of motor vehicles in order to dampen and control relative movement is common practice. In the conventional shock absorber, restriction to movement is dependent upon the passage of hydraulic fluid through control orifices situated within the shock absorber unit. The restriction presented by these orifices is independent of the relative position of the components within the shock absorber and the same amount of dampening of movement occurs whether the deflection of the suspension is small or large. Therefore, with the usual shock absorber a compromise design must be achieved that will provide acceptable control over minor deflections as well as extreme jounce and rebound occurring under full load.

In view of the state of the art, the present invention provides an improved shock absorber in which superior vehicle ride control is achieved and resistance to movement of the sprung mass is dependent upon the extent of deflection of the shock absorber components. During normal operation nominal restriction will be present, however, upon extreme deflection due to increased load or a rough road the shock absorber will evidence greater resistance to relative movement between the sprung and unsprung members.

More specifically, the present invention provides a position sensitive shock absorber having a tapered metering rod cooperating with a metering disc for limited passage of fluid between the rebound and compression pressure chambers within the unit. The annular opening between these members varies in size dependent upon the relative position of the components within the shock absorber.

The invention also includes means for sealing the control orifices so that under extreme jounce and rebound conditions the passage of fluid will be prevented and a hydraulic lock will be achieved. This hydraulic lock provides a stop to further relative movement and prevents a metal to metal contact of the sprung and unsprung vehicle components.

Therefore, it is a principal object of this invention to provide a shock absorber having varying resistance to movement depending upon deflection or stroke position.

It is another object of the present invention to provide an improved shock absorber having stroke sensitive characteristics and including means for sealing the control orifices to prevent extreme shock absorber movement.

The objects and many advantages of this invention will be more clearly understood from the following detailed description and the accompanying drawing in which:

FIGURE 1 is a sectional view of a shock absorber incorporating the present invention; and FIGURE 2 is a sectional view of a portion of the shock absorber of FIGURE 1 showing the components in extreme jounce position.

Referring now to the drawings wherein the presently preferred embodiment of this invention is disclosed, a shock absorber unit 10 is provided with a reservoir tube 12 having a lower closure member 14 welded thereto. A ring 16 is welded to the lower closure member 14 and constitutes the attaching means for securing the shock absorber 10 to an unsprung component of a vehicle suspension system such as the upper control arm of an independent front suspension system.

Positioned concentrically within the reservoir tube 12 is a pressure tube 18 having an annular head or closure 20 secured thereto at its upper end. The cylindrical space between the reservoir tube 12 and the pressure tube 18 constitutes a reservoir 21 for the containment of hydraulic fluid used to operate the shock absorber 10. A piston rod 22 is slidably received in the head 20. An annular ring 24 is affixed to the upper end of the reservoir tube 12 and cooperates with a seal 26 placed about the piston rod 22. A coil spring 27 is interposed between the head 20 and a seal retainer 28 to position the piston rod seal 26. The head 20 has a radial slot 29 to permit the return of any fluid that may leak to the area above the head 20 back to the interior 21 of the reservoir tube 12.

A valve member 30 is secured to the lower end of the pressure tube 18 and is positioned against the closure member 14 of the reservoir tube 12. Member 30 is generally referred to as a "foot valve" and its function is to control the flow of fluid between the interior of the pressure tube 18 and the reservoir 21. The closure 14 is formed to provide a passageway 34 for communication between the reservoir 21 and the valve 30.

The piston rod 22 has a threaded upper end 36 for attachment to a sprung vehicle component. The lower end of the rod 22 threadably receives a piston assembly 38. The interior of the rod 22 is bored out to provide an axial passage 40. A metering rod 32 is secured to the foot valve 30 and extends with telescopic engagement into the passage 40.

The piston assembly 38 divides the interior of the pressure tube 18 into a rebound pressure chamber 42 and a compression or jounce pressure chamber 46. The piston assembly 38 has a body portion or main member 48 that is provided with axial bypass ports 50. These ports 50 act as a control to fluid flow during a jounce stroke. During rebound these parts are closed. The piston rod 22 is formed with a shoulder 52 against which a hat shaped spacer element 54 bears. Spacer 54 is interposed between the shoulder 52 and the main piston member 48. A spring pressed bypass valve plate 56 seals the bypass ports 50 on the rebound pressure chamber side of the piston assembly 38. The main piston piece 48 is secured against the spacer 54 by threaded nut 57 received on the end of the piston rod 22.

A metering disc 58 is disposed concentric about the metering rod 32 and is contained within the nut 57 of piston assembly 38 by a snap ring 54. A radial hole 60 constitutes a rebound orifice joining the internal passageway 40 of the piston rod 22 to the rebound pressure chamber 42. The inner diameter of disc 58 is accurately machined to a dimension slightly less than the diameter of the bore 40.

The metering rod 32 is a tapered member having a reduced midportion 62 that is joined to enlarged upper and lower ends 64 and 66 by intermediate upper and lower tapers 68 and 70. The metering rod 32 has an axial passageway 72 which communicates at its lower end with the reservoir area 76 beneath the foot valve 30. The upper end of the bore 72 is plugged at 77. A radial compression orifice 74 in the rod 32 joins the passageway 72 with the compression pressure chamber 46.

The foot valve 30 provides controlled communication between the compression pressure chamber 46 and the reservoir 21. A spring retainer 78 is trapped between a shoulder provided on the metering rod 32 and the foot valve 30. A recuperation valve plate 80 is lightly sealed against recuperation valve openings 82 extending through the body portion of valve 30. A coil spring 84 closes the valve plate 80 in a check valve like action. The plate 80 will open upon a slight pressure differential to replenish compression chamber 46 during the rebound stroke.

A spring-like valve plate 85 seals a relief passage 86 in the foot valve 30. This mechanism provides a relief valve in the event of an extreme pressure buildup during the compression stroke.

A rubber cup-shaped compression stop piece 88 is positioned in the compression pressure chamber 46 with its rim facing upwardly toward the piston 38. The rim of the cup 88 is adapted to have sealing contact with the depending periphery of the piston body 48 on jounce stroke. The stop cup 88 is maintained in position by a compression stop cup return spring 90. The spring 90 is interposed between the stop cup 88 and the spring retainer 78 trapped against the foot valve 30.

In operation the unit is mounted as a conventional telescopic shock absorber, with the piston rod end 36 attached to a sprung portion of the vehicle body or chassis and the ring 16 attached to an unsprung suspension component. During the rebound or extension stroke hydraulic fluid contained within the rebound pressure chamber 42 is forced through the rebound orifice 60 in the tubular piston rod 22 and past the clearance between the rod 22 and the metering disc 58 into the compression pressure chamber 46. In the central region of shock absorber travel, greater clearance exists between the reduced mid-portion 62 of the metering rod 32 and the metering disc 58 and, therefore, less restriction to movement is present than when the metering disc 58 is operating near the extreme ends of the rod 32 where the rod diameter is greater and the clearance is reduced. Due to this greater clearance in the center position, the rebound force is controlled primarily by the size of the rebound orifice hole 60 during that portion of the stroke.

Near the end of the rebound stroke the reduced annular area between the metering disc 58 and the metering rod 32 controls the pressure drop of the hydraulic fluid passing from the rebound pressure chamber 42. By reducing this area to a minimum a large pressure drop is created. This pressure, acting on the piston area causes a high force resulting in a hydraulic lock or rebound stop. This action can take the place of the usual rubber bumpers in a suspension system.

As the suspension system moves from the rebound to the jounce position the shock absorber piston rod 22 is forced downwardly into the pressure tube 18 and hydraulic fluid in the compression pressure chamber 46 is displaced by the piston assembly 38. Most of the fluid passes through the bypass ports 50 in the piston 38 which were closed by the bypass valve plate 56 during the rebound stroke. Due to the presence of the piston rod 22, the rebound pressure chamber 42 has less volume than the compression pressure chamber 46 and, therefore some hydraulic fluid (an amount equal to the displacement of the piston rod 22) is forced through the compression orifice 74 in the metering rod 32 and exits to the reservoir 76 area situated beneath the foot valve 30. The size of the orifice 74 and the bypass ports 50 determine the pressures in the pressure tube 18, and thus create the compression force resisting or controlling movement during the jounce stroke until the piston assembly 38 makes contact with the compression stop cup 88.

During the jounce stroke the piston 38 moves downwardly toward the compression stop cup 88 until contact is made. FIGURE 2 shows the piston member 48 in engagement with the stop cup 88 and the spring 90 compressed. The stop cup 88 is located below the compression orifice 74 in the tubular metering rod 32 and when the lower edge of the piston 48 contacts the top of the compression stop cup 88, the only fluid exit from the compression pressure chamber 46 is through the annular area between the cup 88 and the metering rod 32. Since this annular area decreases due to the increased metering rod diameter, as the cup 88 is moved towards the enlarged lower portion 66 of the rod 32, the pressure in the compression pressure chamber 46 rises progressively. This pressure acts on the total area of the piston assembly 38 creating a compression stop force. The relief valve 84 at the lower end of the metering rod 32 will open if the pressure becomes excessive to prevent damage to the structure under extreme conditions.

As the suspension returns from the full jounce position, the rebound operation is repeated. The fluid flowing through the piston rod 22 causes the separation of the piston 38 and the compression stop cup 88. The fluid also flows past the cup 88 through the channels 91 in the outer diameter of cup 88. The spring 90 causes the cup 88 to return to its normal position. During the rebound stroke the recuperation valve 80 at the lower end of the compression pressure chamber 46 opens to allow fluid to return from the reservoir 76 to replace fluid forced out by the piston rod 22 during the compression or jounce stroke.

It will be apparent that if suspension deflections are small the dampening forces created by the shock absorbers will be similar to that produced by a standard shock absorber or more likely the unit will be designed to provide a softer ride for minor road irregularities. On large movements the dampening force increases as the shock absorber nears the limit of travel to retard further suspension travel. Since the limiting force is arrived at smoothly, harshness usually associated with rubber bumper stops is eliminated.

The present invention incorporates stroke-sensitive dampening in a package no larger than a conventional heavy-duty shock absorber. The invention permits designing either the rebound or compression forces independently and also changing these forces at one part of the stroke without affecting forces at other positions. This shock absorber unit allows the rubber bumpers normally provided in a suspension system to be eliminated and, even more important, the attaching structures for the bumpers are dispensed with. The type of force pattern developed by the shock absorber 10 permits the reduction in dampening forces near the central design position and thus softening the "boulevard ride" characteristic. At the same time, if the car is driven while heavily loaded, the increased dampening near the ends of the suspension travel improves the ride over conventional systems and prevents "bottoming."

The foregoing description constitutes the preferred embodiment of the present invention, however, it is contemplated that alternate constructions may occur to those skilled in the art which will come within the scope and spirit of the following claims.

We claim:

1. A fluid shock absorber unit having a reciprocatable tubular piston rod and a tubular metering rod telescopically received within said piston rod; a valved piston secured to the end of said tubular piston rod; said piston dividing said unit into first and second pressure chambers; said piston having a metering orifice surrounding said metering rod and defining a first annular port adapted to restrict fluid flow therethrough; a passage in said tubular piston rod providing communication between one of said chambers, the interior of said tubular piston rod and said first annular port; an annular reservoir chamber surrounding one of said pressure chambers; a radial passage in said metering rod communicating with said other chamber, the interior of said metering rod, and said reservoir; said metering rod having a double taper and being of less cross section size at its mid portion than at its end portions; control ports in said valved piston adapted to restrict fluid flow therethrough; a resiliently positioned stop member slideably disposed in said unit about said metering rod; said stop member being adapted to seal said ports upon contact by said valve piston; said stop member having a metering orifice surrounding said metering rod and defining a second annular port adapted to restrict fluid flow therethrough.

2. A fluid shock absorber unit having a pressure tube and a reservoir; a reciprocatable tubular piston rod and a tubular metering rod telescopically received within said piston rod; a valved piston secured to the end of said tubular piston rod; said piston dividing said pressure tube into first and second pressure chambers; said piston having a metering orifice surrounding said metering rod and defining a first annular port adapted to restrict fluid flow therethrough; a passage in said tubular piston rod providing communication between one of said chambers, the interior of said tubular piston rod and said first annular port; a radial passage in said metering rod communicating with said other chamber, the interior of said metering rod, and said reservoir; said metering rod having an axially graduated exterior size; control ports in said valved piston adapted to restrict fluid flow therethrough; a resiliently positioned stop member slideably disposed in said tube about said metering rod; said member dividing one of said chambers into two portions; said stop member being adapted to seal said ports upon contact by said valve piston; said stop member having a metering orifice surrounding said metering rod and defining a second annular port providing controlled restricted communication between said portions.

3. A fluid shock absorber unit having a pressure tube and a reservoir; a reciprocatable tubular piston rod and a tubular metering rod telescopically received within said piston rod; a valved piston secured to the end of said tubular piston rod; said piston dividing said pressure tube into first and second pressure chambers; said piston having a metering orifice surrounding said metering rod and defining a first annular port adapted to restrict fluid flow therethrough; a passage in said tubular piston rod providing communication between one of said chambers, the interior of said tubular piston rod and said first annular port; a radial passage in said metering rod communicating with said other chamber, the interior of said metering rod, and said reservoir; said metering rod having an axially graduated exterior size; control ports in said valved piston adapted to restrict fluid flow therethrough; a resiliently positioned member slideably disposed in said tube about said metering rod; said member dividing one of said chambers into two portions; said member having a metering orifice surrounding said metering rod and defining a second annular port providing controlled restricted communication between said portions.

4. A fluid shock absorber unit having a pressure tube and a reciprocatable valved piston therein; a metering rod received within said piston rod; said piston dividing said tube into first and second pressure chambers; a metering orifice in said piston, surrounding said metering rod and defining a restricted annular port therewith; said annular port providing controlled communication between said chambers; a member disposed in said tube about said metering rod and dividing one of said chambers into two portions; said member having a metering orifice surrounding said metering rod and defining a second restricted annular port therewith for controlled restricted communication between said portions.

5. A fluid shock absorber unit having a pressure tube filled with hydraulic fluid and a separate reservoir chamber; a reciprocatable tubular piston rod and a tubular metering rod telescopically received within said piston rod; a valved piston secured to the end of said tubular piston rod; said piston dividing said tube into first and second pressure chambers; a metering orifice in said piston, surrounding said metering rod and defining a restricted annular port therewith; a passage in said tubular piston rod permitting communication between one of said chambers, the interior of said tubular piston rod and said metering orifice; a radial passage in said metering rod communicating with said other chamber, the interior of said metering rod, and said reservoir; control ports in said valved piston providing restricted flow passages therethrough; a resiliently positioned stop member slideably disposed in said unit about said metering rod; said stop member being adapted to seal said control ports upon contact by said valve piston.

6. The combination of claim 5 wherein said metering rod extends substantially the entire length of said pressure tube.

References Cited in the file of this patent

UNITED STATES PATENTS

| | | |
|---|---|---|
| 488,651 | Gilfillan | Dec. 27, 1892 |
| 949,654 | Knapp | Feb. 15, 1910 |
| 1,445,615 | Ferres | Feb. 13, 1923 |
| 1,635,284 | Lomar | July 12, 1927 |
| 1,866,167 | Lolley | July 5, 1932 |
| 2,015,758 | Moulton | Oct. 1, 1935 |
| 2,053,053 | Swalm | Sept. 1, 1936 |
| 2,171,827 | Elliott | Sept. 5, 1939 |
| 2,395,027 | Whisler | Feb. 29, 1946 |
| 2,456,736 | Rossman | Dec. 21, 1948 |
| 2,599,477 | Patriquin | June 3, 1952 |
| 3,003,595 | Patriquin | Oct. 10, 1961 |